United States Patent
Ameres et al.

(10) Patent No.: US 10,996,552 B2
(45) Date of Patent: May 4, 2021

(54) PSEUDO-VOLUMETRIC DISPLAY APPARATUS AND METHODS

(71) Applicant: RENSSELAER POLYTECHNIC INSTITUTE, Troy, NY (US)

(72) Inventors: Eric Louis Ameres, Cohoes, NY (US); Gordon Patrick Clement, Whitefield, NH (US)

(73) Assignee: Rensselaer Polytechnic Institute, Troy, NY (US)

( * ) Notice: Subject to any disclaimer, the term of this patent is extended or adjusted under 35 U.S.C. 154(b) by 613 days.

(21) Appl. No.: 15/527,265

(22) PCT Filed: Nov. 6, 2015

(86) PCT No.: PCT/US2015/059393
§ 371 (c)(1),
(2) Date: May 16, 2017

(87) PCT Pub. No.: WO2016/081205
PCT Pub. Date: May 26, 2016

(65) Prior Publication Data
US 2019/0094678 A1    Mar. 28, 2019

Related U.S. Application Data (60) Provisional application No. 62/081,791, filed on Nov. 19, 2014, provisional application No. 62/119,315, (Continued)

(51) Int. Cl.
*H04N 9/31*    (2006.01)
*G03B 37/04*    (2021.01)
(Continued)

(52) U.S. Cl.
CPC ............ *G03B 37/04* (2013.01); *G09F 19/12* (2013.01); *G09F 19/18* (2013.01); *G09F 19/228* (2013.01);
(Continued)

(58) Field of Classification Search
CPC .. H04N 13/398; H04N 13/302; H04N 13/351; H04N 13/117; H04N 9/3147;
(Continued)

(56) References Cited

U.S. PATENT DOCUMENTS 6,905,218 B2    6/2005    Courchesne
2001/0040671 A1    11/2001    Metcalf
(Continued)

FOREIGN PATENT DOCUMENTS

| CN | 103257454 A | 8/2013 |
|---|---|---|
| CN | 103616771 A | 3/2014 |
| GB | 802213 A | 10/1958 |

OTHER PUBLICATIONS

International Search Report issued in PCT/US2015/059393, dated Jan. 19, 2016.

*Primary Examiner* — Nasser M Goodarzi
*Assistant Examiner* — Patrick A Ryan
(74) *Attorney, Agent, or Firm* — Murtha Cullina LLP; Anthony P. Gangemi (57) ABSTRACT

A pseudo-volumetric display apparatus includes a first inwardly facing image display surface having a continuous geometry, with an open upper end, for presenting an interior panoramic image, and a second upwardly facing image display surface, located at a lower end of the first image display surface, for presenting a second image. The images may be generated optically or electronically. The second image is correlated and synchronized to the first image, and the first image display surface is sized and positioned to (Continued)

facilitate simultaneous viewing of both images from outside of the first surface via the open upper end. The same or coupled information may be simultaneously presented as a continuous Cartesian representation on the first image display surface and as a polar representation on the second image display surface, and content of one representation may be synchronized in accordance with a selected position in the other representation.

22 Claims, 8 Drawing Sheets

Related U.S. Application Data filed on Feb. 23, 2015, provisional application No. 62/120,518, filed on Feb. 25, 2015.

(51) Int. Cl.
*G09F 19/18* (2006.01)
*G09F 19/12* (2006.01)
*G09F 19/22* (2006.01)
*H04N 13/117* (2018.01)
*H04N 13/302* (2018.01)
*H04N 13/351* (2018.01)
*H04N 13/398* (2018.01)

(52) U.S. Cl.
CPC ......... *H04N 9/3147* (2013.01); *H04N 13/117* (2018.05); *H04N 13/302* (2018.05); *H04N 13/351* (2018.05); *H04N 13/398* (2018.05); *H04N 2213/001* (2013.01)

(58) Field of Classification Search
CPC .. H04N 2213/001; G03B 37/04; G09F 19/18; G09F 19/12
See application file for complete search history.

(56) References Cited

U.S. PATENT DOCUMENTS

| | | | |
|---|---|---|---|
| 2002/0067465 A1* | 6/2002 | Li | G03B 35/00 352/57 |
| 2004/0021631 A1* | 2/2004 | McLaughlin | G09F 9/30 345/156 |
| 2010/0328306 A1* | 12/2010 | Chau | G02B 27/2214 345/419 |
| 2012/0293632 A1* | 11/2012 | Yukich | H04N 5/247 348/47 |
| 2013/0181901 A1* | 7/2013 | West | G09G 5/14 345/161 |
| 2014/0016099 A1* | 1/2014 | Choi | G02B 27/2271 353/30 |
| 2015/0070475 A1* | 3/2015 | Kim | G02B 27/2278 348/51 |

* cited by examiner

PSEUDO-VOLUMETRIC DISPLAY APPARATUS AND METHODS

CROSS REFERENCE TO RELATED APPLICATIONS

This application is the National Phase filing under 35 U.S.C. § 371 of International Application No. PCT/US2015/059393, filed on Nov. 6, 2015, and published on May 26, 2016, as WO/2016/081205 A1, and claims priority to U.S. Provisional Patent Application Nos. 62/081,791, filed Nov. 19, 2014; 62/119,315, filed Feb. 23, 2015; and 62/120,518, filed Feb. 25, 2015. The contents of each of the prior applications are hereby incorporated by reference herein in their entirety.

FIELD OF THE INVENTION

This invention relates generally to visual displays and, more particularly, to apparatus and methods for providing a pseudo-volumetric display. The term "pseudo-volumetric display", as used herein, refers to a display presented on interior surfaces that collectively define a volume.

BACKGROUND ART

Various visual display systems are known for simultaneously providing visual information to multiple viewers. Large flat screens are commonly employed to display movies in movie theaters. Large scale panoramic screens have been employed to provide visual imagery to viewers located within a space surrounded by the panoramic screen. The large scale panoramic screens are expensive and time consuming to set up. In such systems, the viewers are immersed in the visual imagery but since their attention is directed outwardly and diffused, there is little opportunity for group interaction and collaboration. U.S. Pat. No. 6,905,218 B2, for example, discloses a panoramic and horizontally immersive image display system adapted to partially receive viewers in the concavity formed by the display screen.

360 degree LED video displays are also known which provide imagery on an outer cylindrical surface for external viewing. When such displays are located at eye level, viewers see different portions of the panoramic imagery but the screen blocks eye contact between the different viewers. 360 degree ring projection screens, typically suspended from a ceiling, have been used to present panoramic imagery on the exterior and interior cylindrical surfaces. These 360 degree ring projection screens are typically sized and positioned for viewing by multiple viewers located below the projection screen. Accordingly, attention is directed upwardly and away from other viewers.

A need thus exists for a new, engaging and interactive visual display system for sharing visual information among multiple simultaneous viewers while facilitating group interaction and collaboration.

BRIEF SUMMARY OF THE INVENTION

According to the present invention, this need is satisfied and various benefits are realized by the provision of a pseudo-volumetric display apparatus that includes a first inwardly facing image display surface having a continuous geometry with an open upper end for presenting an interior panoramic image. A second upwardly facing image display surface is located at a lower end of the first image display surface for presenting a second image. A first image generator generates the interior panoramic image on the first image display surface. A second image generator generates the second image on the second image display surface. The second image is correlated and synchronized to the first image, and the first image display surface is sized to facilitate simultaneous viewing of the panoramic image and the second image from outside of the first surface via the open upper end.

The first image display surface may comprise at least one of a cylindrical, conical, slanted or faceted surface. The second upwardly facing image display surface may comprise at least one of a planar, curved, slanted or faceted surface.

Advantageously, the first inwardly facing image display surface may comprise an interior cylindrical surface. The second upwardly facing image display surface may comprise a planar base surface adjoining a lower edge of the interior cylindrical surface. The interior cylindrical surface may have a diameter and a height that facilitate the simultaneous viewing of the panoramic image and the second image from outside of the cylindrical surface via the open upper end.

The first image generator and the second image generator may comprise at least one of an optical projector or an electronic display.

Advantageously, the first image generator may comprise a plurality of optical projectors spaced about a periphery of the first inwardly facing image display surface, and the second image generator may comprise at least one of an overhead optical projector, a rear optical projector, or an electronic display.

Advantageously, the pseudo-volumetric display apparatus may further include a controller for continuously synchronizing the second image with the interior panoramic image, and a user interface connected to the controller for user interaction with the synchronized images.

The interior panoramic image and the second image may comprise at least one of a static or a dynamic visual image or data representation.

The pseudo-volumetric display apparatus of the present invention may further include a support structure for supporting the interior cylindrical surface in an upright position and the planar base surface on a floor or a table.

The pseudo-volumetric display apparatus may further include a first source of content for the interior panoramic image and a second source of content for the second image. The content may comprise at least one of stored images, graphics, data or information, or a live feed of images, graphics, data or information. The first source and the second source may comprise at least one of an image or set of images, a data set, a video game engine, a simulation, streaming information (e.g. video or text) or a graphical user interface.

A method is also provided for interactively displaying information employing the pseudo-volumetric display apparatus of the present invention. The method may include simultaneously presenting the same information or coupled information as a continuous Cartesian representation on the first image display surface and as a polar representation on the second image display surface; and synchronizing content of one of the polar representation and the continuous Cartesian representation in accordance with a selected position in the other of the polar representation or the continuous Cartesian representation.

The displayed information may comprise visual images or data to be visualized.

A position in the continuous Cartesian representation may be identified by an angular dimension and a height dimension. A position in the polar representation may be identified by an angular dimension and a radial dimension. The first image display surface and the second image display surface may share an angular dimension providing a consistent geometric connection between the continuous Cartesian representation on the first image display surface and the polar representation on the second image display surface.

The selected position may be user selectable or may track motion of a moving object.

In one embodiment, the polar representation may comprise a map or satellite imagery; the selected position may comprise a location on the map or satellite imagery; and the continuous Cartesian representation may comprise a panoramic view from this location.

Advantageously, the polar representation and the continuous panoramic representation may be independently scalable in the radial dimension and the height dimension, respectively.

In another embodiment, the information may comprise radar or Lidar data, with latitude and longitude presented on the second image display surface, and altitude presented on the first image display surface.

The shared angular dimension, the height dimension and the radial dimension may comprise orthogonal display dimensions for contextualizing data, and the method may further comprise employing the pseudo-volumetric display apparatus to visualize and interactively explore multi-dimensional data.

The pseudo-volumetric display apparatus may also advantageously be employed for shared visualization and to facilitate interaction and collaboration among multiple simultaneous viewers.

The pseudo-volumetric display apparatus and methods of the present invention provide a unique, shared, interactive visualization platform, scaled, configured and positioned to be gathered around as a focal point for and a common interface among multiple simultaneous viewers. Thus, it supports an environment for a small group of individuals to have a personal and fluid exchange and discourse.

While the first and second image display surfaces can be largely independent, their shared edge provides a natural interface for various dimensions of visualization, simulation and interaction. Any traditional two-dimensional images and applications can be placed on the surfaces but each of the surfaces has one continuous shared angular dimension. Information can be wrapped around the display surfaces as in the rings of a tree, the spokes of a wheel or even in a panoramic view of a real or virtual landscape. The first image display surface can be used to dive into data shown on the second image display surface, and vice versa.

Unlike other multi-screen interfaces, the shared edge of the two image display surfaces of the pseudo-volumetric display apparatus of the present invention allows users to maintain context while exploring varying scales and dimensions. The information on the surfaces can be completely interactive and scalable. The multi-dimensionality of the new display apparatus makes it ideal for large scale "big" data exploration and visualization, as well as evaluation and exploration of real and virtual environments (for example, with panoramic imagery on the first image display surface and a "heads up" map presented on the second image display surface).

The scale of the pseudo-volumetric display apparatus of the present invention is such that users can gather and move around the display apparatus looking inward rather than being immersed within a large panoramic screen system. Users view and interact with content from outside the new display apparatus as if gathered around a table or campfire. The scale, orientation and positioning of the pseudo-volumetric display apparatus also encourages eye contact and interaction among multiple simultaneous users.

Although the first image display surface presents a panoramic image, the viewer's focus turns inward unlike the larger scale immersive screens that dilute attention and turn it outward. The paradigm shift is from a panoramic screen being a space in which you work, to an object around which multiple users may work and directly interact. The display of the present invention thus provides a novel, collaborative, multi-user tool that solves the age-old problem of gathering around a small screen without diffusing attention. It draws its strength from facilitating viewers gathering around a shared visualization to exchange and explore ideas and information.

The present invention can be used for collaborative problem solving, design, data visualization and exploration, education and location based entertainment. It is particularly useful for large data visualizations and shared viewing of panoramic images and video in a relatively small volume.

The technology of the present invention facilitates interacting with computer applications (i.e., tools, visualization, games, etc.), especially in collaborative settings involving multiple simultaneous users. It has applications in visualization, simulation, design, art, education and entertainment. Unlike other multi-user "immersive" technologies, rather than "drowning" a user in imagery, it provides common focus and shared attention while preserving personal space and "eye" contact. It is of human scale, but is relatively lightweight and portable compared to competitive large-scale projection and "cave-like" methods of group interaction.

Accordingly, the pseudo-volumetric display apparatus and methods of the present invention uniquely satisfy the need for a new, engaging and interactive visual display system for sharing visual information among multiple simultaneous viewers while facilitating group interaction and collaboration.

BRIEF DESCRIPTION OF THE DRAWING FIGURES

These and other objects, features, uses and benefits of the present invention will be readily understood from the following detailed description taken in conjunction with the accompanying drawings in which.

DETAILED DESCRIPTION

Figure 1:
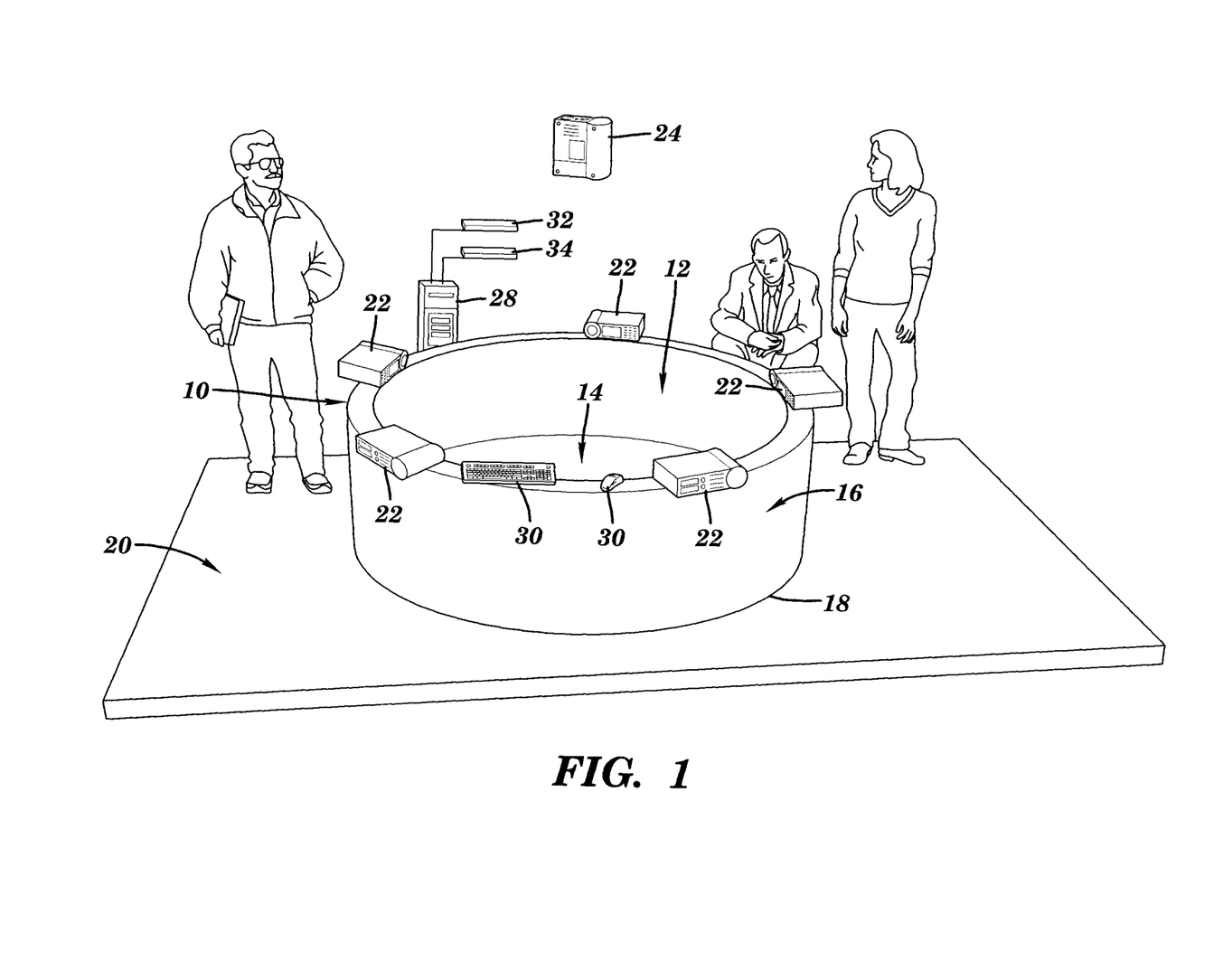
FIG. 1 is a schematic representation of a pseudo-volumetric display apparatus according to the present invention.

As schematically illustrated in FIG. 1, the pseudo-volumetric display apparatus 10 of the present invention includes a first inwardly facing image display surface 12 having a continuous geometry with an open upper end for presenting an interior panoramic image, and a second upwardly facing image display surface 14 located at a lower end of the first image display surface for presenting a second image, correlated and synchronized with the interior panoramic image.

The first image display surface 12 may comprise at least one of a cylindrical, conical, slanted or faceted inner surface of an upstanding wall or screen 16. The first inwardly facing image display surface is continuous about its periphery in one dimension and open ended at its upper and lower ends.

The second upwardly facing image display surface 14 may comprise at least one of a planar, curved, slanted or faceted surface. A periphery of the second upwardly facing image display surface adjoins the lower end of the first image display surface.

As illustrated in FIG. 1, the first inwardly facing image display surface 12 may advantageously comprise an interior cylindrical surface. The second upwardly facing image display surface 14 may advantageously comprise a planar base surface adjoining a lower edge of the interior cylindrical surface.

The pseudo-volumetric display apparatus 10 of the present invention is advantageously positioned on a floor or table with the second display surface resting atop and extending along the floor or tabletop. The first inwardly facing image display surface 12 has a diameter, configuration and a height that facilitates the simultaneous viewing of the panoramic image and the second image from outside of the cylindrical surface via the open upper end.

The first inwardly facing image display surface 12 may comprise an interior surface of a wall 16 that serves as a projection screen, or may comprise the screen of an electronic display. Similarly, the second upwardly facing display surface 14 may comprise an inner surface of a base member 18 that serves as an optical projection screen or the screen of an electronic display.

Referring back to FIG. 1, the pseudo-volumetric display apparatus 10 of the present invention may also include a support structure 20 for supporting the first inwardly facing display surface 12 in an upstanding or upright position and the second image display surface 14 in a generally horizontal position on a floor or a tabletop.

The scale of the image display surfaces is such that a user or users can gather and move around the display apparatus looking inward. Users view and interact with content provided by the pseudo-volumetric display apparatus from outside, via the open upper end, as if gathered around a table or a campfire. This scale and positioning on a floor or tabletop also encourages eye contact and interaction among multiple users.

Referring again to FIG. 1, the pseudo-volumetric display apparatus 10 of the present invention also includes a first image generator 22 for generating an interior panoramic image on the first image display surface 12, and a second image generator 24 for generating a second image on the second image display surface 14. The second image is correlated and synchronized to the first image by a controller 28.

The first image generator 22 and the second image generator 24 may comprise at least one of an optical projector or an electronic display (e.g., curved LCD displays, flexible display technology, etc.).

In a prototype of the pseudo-volumetric display apparatus of the present invention, the first inwardly facing image display surface 12 was cylindrical, measuring approximately 6 feet in diameter with a height of 22 inches. The second upwardly facing image display surface 14 was planer and adjoined the lower edge of the first image display surface. The first and second image display surfaces were constructed of foam core with a steel unistrut and custom laser cut steel support structure. An optional top "shelf" extended from the top edge of the first image display surface in a ring of approximately 8 foot outer diameter to cover the support structure and distributed optical projectors, as well as to provide a surface for uses to lean on or place personal items.

In the prototype, the first and second image display surfaces served as screens for six optical projectors. A single, downwardly facing overhead projector 24 mounted 8-10 feet above, either to a ceiling or a truss, projects a second image on the second image display surface 14. The projection from the overhead optical projector was masked to match the circumference of the second image display surface.

Five identical optical projectors 22 were mounted at the top of the cylindrical wall 16 defining the first inwardly facing display surface 12, at even spacing, each projecting its image across the center of the display apparatus to the opposite interior wall. Each of these projectors had a throw ratio of approximately 1.4 so that the five projections overlap at the edges. Geometry correction and blending (provided in either the projector hardware or a connected system controller/computer system) was employed to present a single seamless interior panoramic image on the first inwardly facing image display surface.

The five wall projectors used in the prototype were Acer K335 models, chosen for their reasonable resolution (WXGA), brightness (1000 lm), throw ratio (1.4:1) and relatively low noise level (33 dB), but other projectors of comparable or different quality and/or characteristics could be used.

The overhead projector used in the prototype was an Acer H7550ST model, chosen for its higher resolution (1080 p), relatively short throw ratio (0.69-0.76:1), high brightness (3000 lm) and low noise level (33 dB), but other projectors of comparable or different quality and/or characteristics could also be employed.

In the prototype, a computer 28 equipped with a six-output graphics card (currently an ATI Firepro W610) provides video signals to the six projectors. A single computer is preferred, but multiple computers or other control equipment could be employed. The computer was attached to each of the projectors using a HDMI cable of sufficient length, but other types of connections could be employed.

In the prototype, the computer ran Microsoft Windows 8 operating system along with drivers from AMD/ATI that support ATI's "eyefinity" mode in the graphics card to allow other software (currently PixelWix PixelWarp Evo) to address the graphics card appropriately and provide the services necessary to provide the correct geometry and screen blending for the projectors to present a seamless display. Other known systems and application software could be used for geometry correction and blending.

The number, locations, type and characteristics of the projectors used to generate the interior panoramic image on the first image display surface and the second image on the second image display surface may vary. For example, instead of an overhead optical projector to create the second image display, a rear optical projector, or an electronic display may be employed.

Referring again to FIG. 1, the pseudo-volumetric display apparatus 10 advantageously includes a controller or computer 28 for continuously synchronizing the second image with the interior panoramic image, and a user interface 30 connected to the controller for user interaction with the synchronized images. Image synchronization may be performed directly as part of a single integrated computer program or distributed via inter-process communications such as a network messaging system, or other computer communication protocol method or by any other known fashion. The user interface may include a keyboard, mouse, touch screen and/or other available input device.

The pseudo-volumetric display apparatus 10 may further include a first source 32 of content for the interior panoramic image and a second source 34 of content for the second image. The interior panoramic image and the second image may comprise at least one of a static or a dynamic visual image or data representation. The content may comprise at least one of stored images, graphics, data or information, or a live feed of images, graphics, data or information. The first source 32 and the second source 34 may comprise at least one of an image or set of images, a data set, a video game engine, a simulation, streaming information (e.g. video or text) or a graphical user interface. The first and second sources may comprise a single source or multiple sources.

Figure 2A:
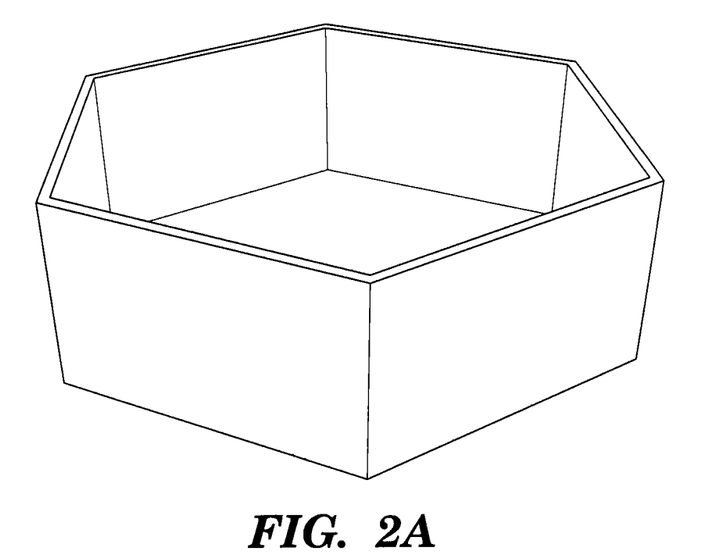
FIGS. 2A and 2B illustrate alternate shapes of the pseudo-volumetric display apparatus.
Figure 2B:
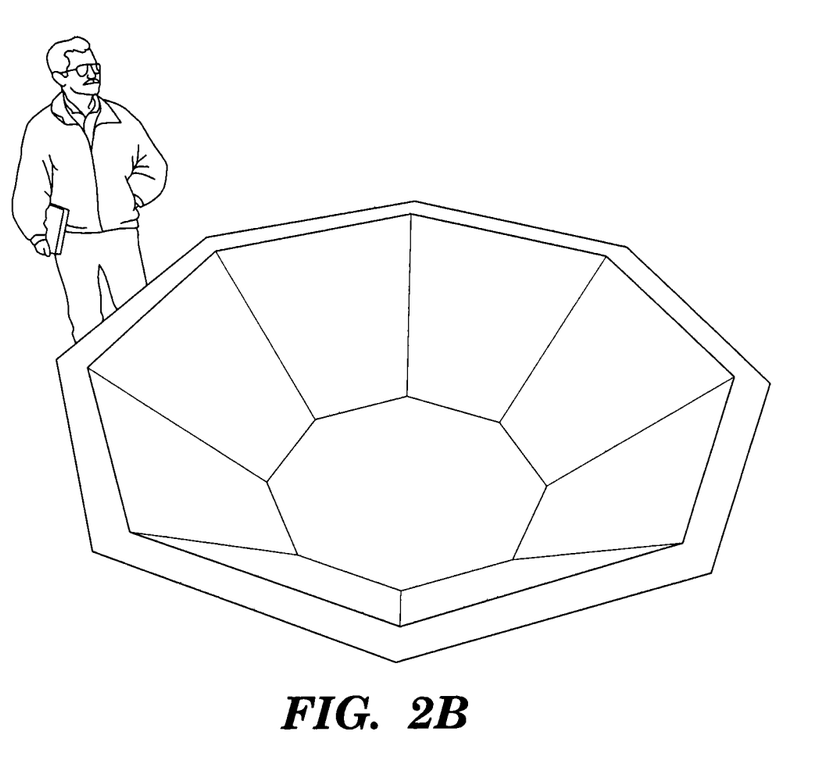

The first inwardly facing display surface for presenting an interior panoramic image and the second upwardly facing display surface for presenting the second image share a common edge at the lower end of the first image display surface which provides a consistent geometric connection between the two image display surfaces. The overall shape of the first inwardly facing display surface need not be cylindrical and the perimeter of the second display surface need not be circular. FIG. 2A, for example, illustrates a hexagonal configuration, and FIG. 2B illustrates an 8 sided "dish" shaped configuration. Other shapes and configurations are usable provided they form an open, hollow three-dimensional space viewable from outside via the open upper end. The physical scale of the display apparatus is also variable; it could, for example, be a small "dish" display on a tabletop, or a "campfire" sized version to be gathered around by a group of users, either standing or seated.

The presently preferred embodiment employs a cylindrical surface as the first inwardly facing display surface and a disk of equal diameter to the cylinder, as the second display surface.

The present invention also provides a method for interactively displaying information employing the pseudo-volumetric display apparatus. The method relies on the shared angular dimension to provide a consistent geometric connection between the images provided on the two image display surfaces regardless of the scaling and translation of any information presented in the other two dimensions (i.e., the height dimension of the first image display surface, and the radial dimension of the second display surface).

The method preferably includes simultaneously presenting the same information or coupled information as a continuous Cartesian representation on the first image display surface and as a polar representation on the second image display surface; and synchronizing content of one of the polar representation and the continuous Cartesian representation in accordance with a selected position in the other of the polar representation or the continuous Cartesian representation.

Figure 3:
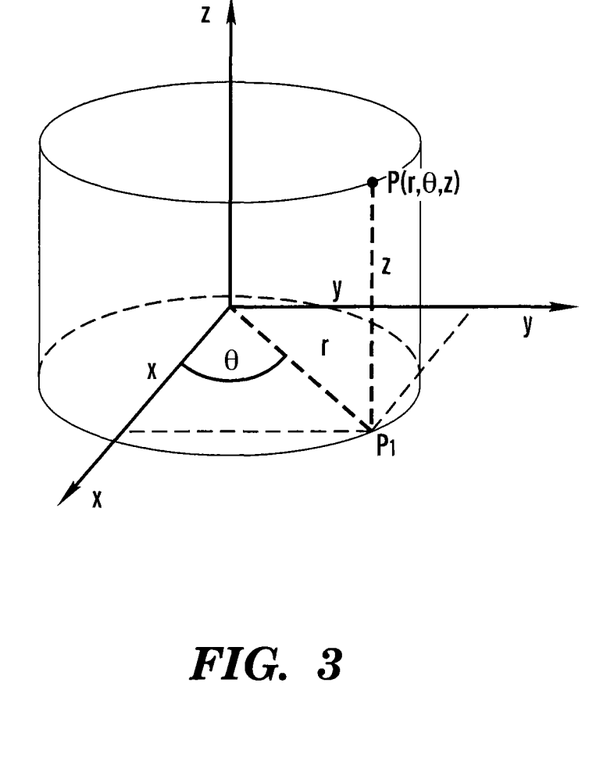
FIG. 3 depicts a cylindrical coordinate system useful in the present invention.

As generally indicated in the cylindrical coordinate system of FIG. 3, a position in the continuous Cartesian representation is identified by an angular dimension θ and a height dimension z. A position in the polar representation is identified by an angular dimension θ and a radial dimension r. The first image display surface and the second image display surface share an angular dimension θ providing a consistent geometric connection between the continuous Cartesian representation on the first image display surface and the polar representation on the second image display surface.

The displayed information may comprise visual images or data to be visualized.

The selected position may be user selectable, e.g., via the user interface, or may track motion of a moving object, e.g., a flying aircraft.

Figure 4:
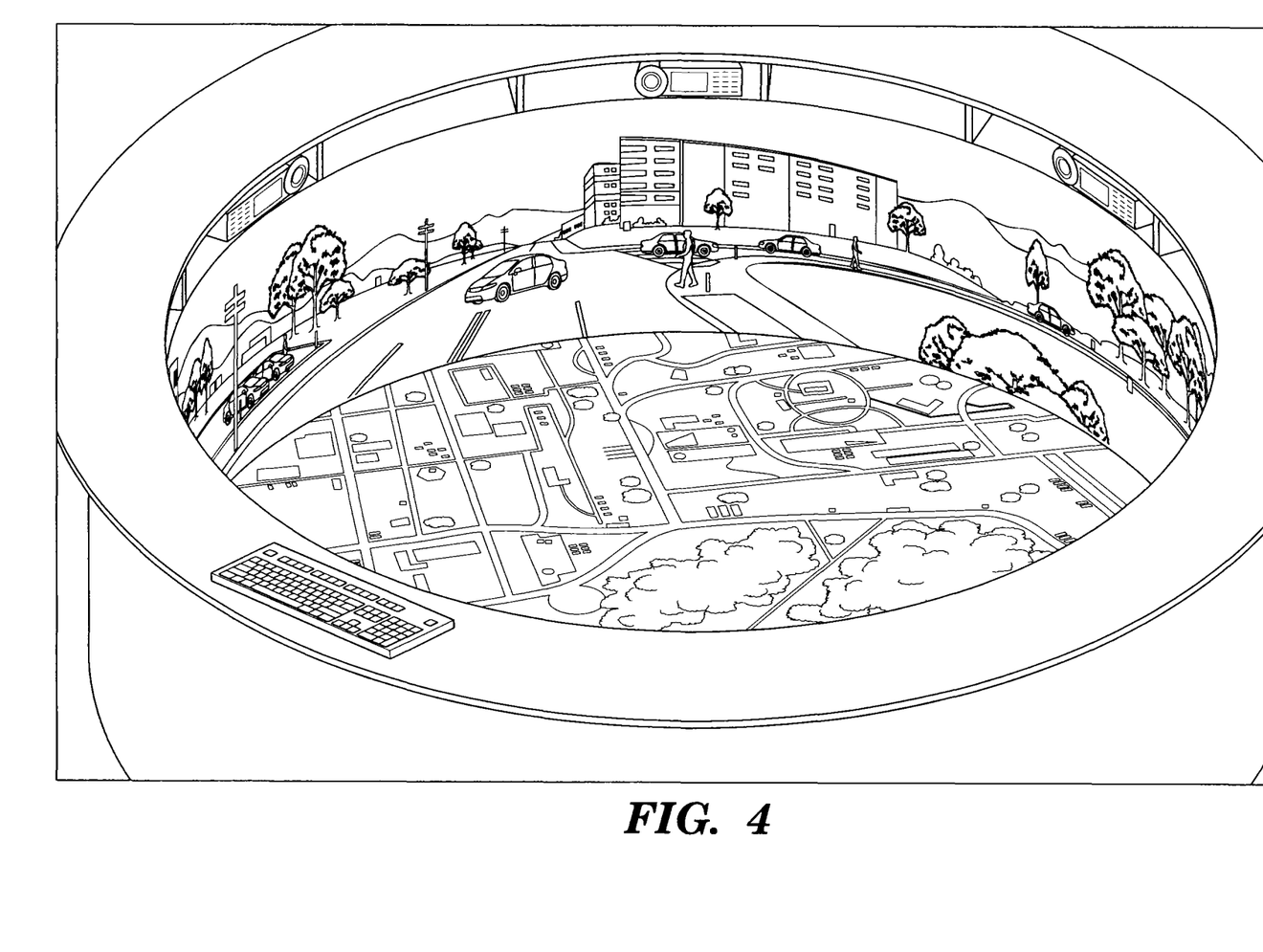
FIG. 4 illustrates a location based application of the pseudo-volumetric display apparatus.

In one embodiment, as illustrated in FIG. 4, the polar representation may comprise a map or satellite imagery. The selected location may comprise a location on the map or satellite imagery, and the continuous Cartesian representation may comprise a panoramic view from this location. Advantageously, the polar representation and the continuous panoramic representation may be independently scalable in the radial dimension and the height dimension, respectively.

Figure 5:
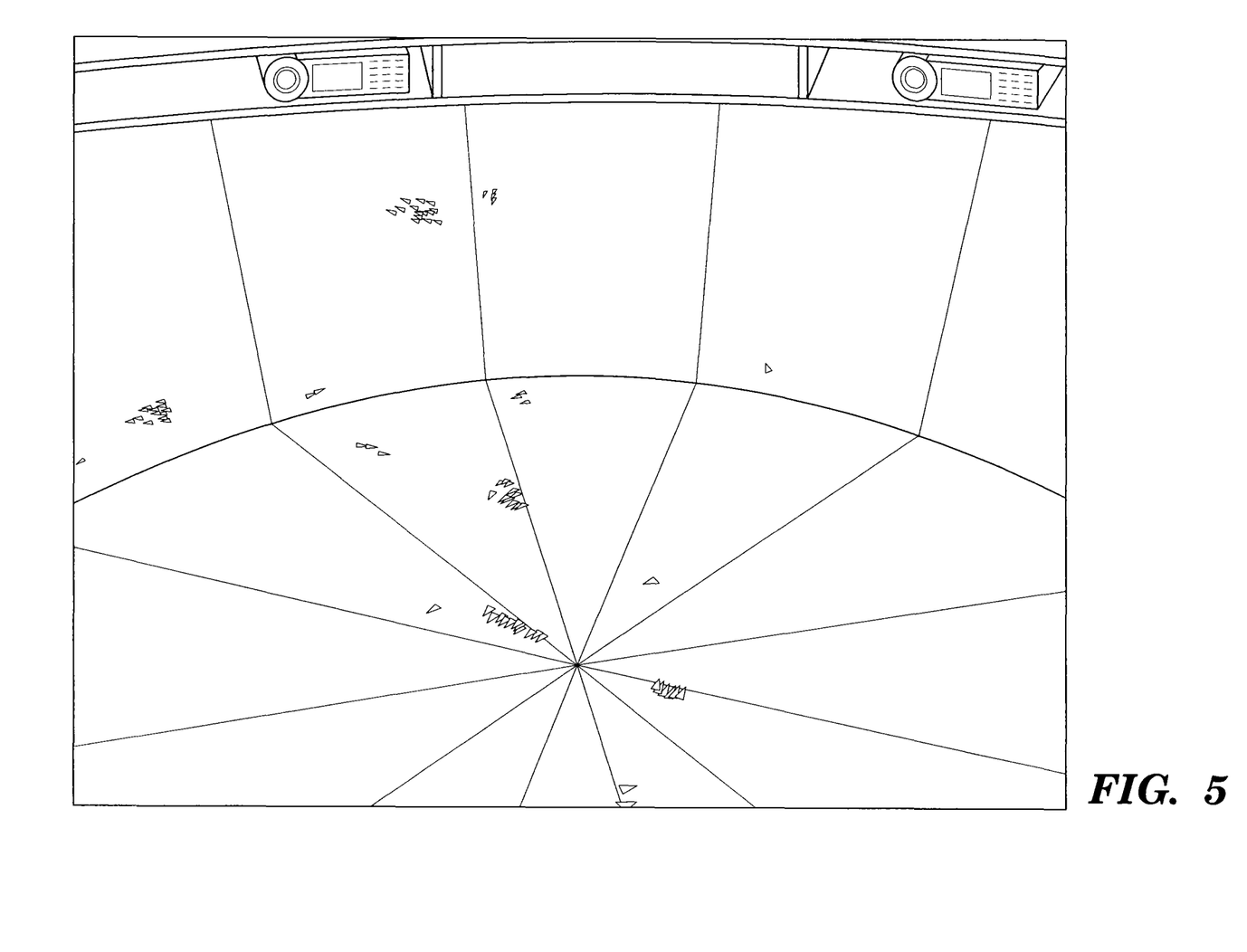
FIG. 5 illustrates an enhanced radar display with the pseudo-volumetric display apparatus.

In another embodiment, as illustrated in FIG. 5, the information may comprise radar or Lidar data, with latitude and longitude presented on the second image display surface, and altitude presented on the first image display surface.

Figure 6:
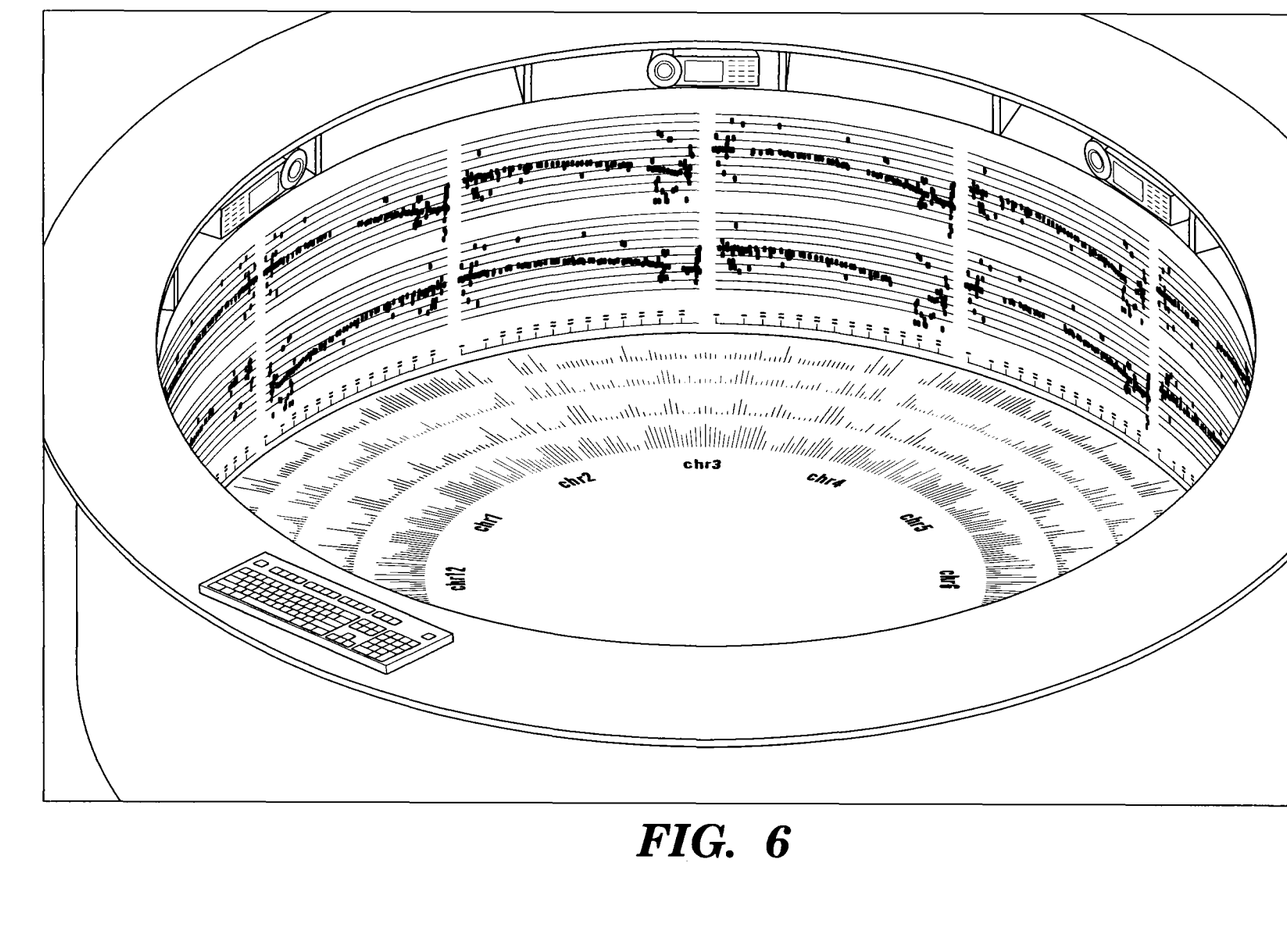
FIGS. 6 and 7 illustrate multi-dimensional data displays with the pseudo-volumetric display apparatus.
Figure 7:
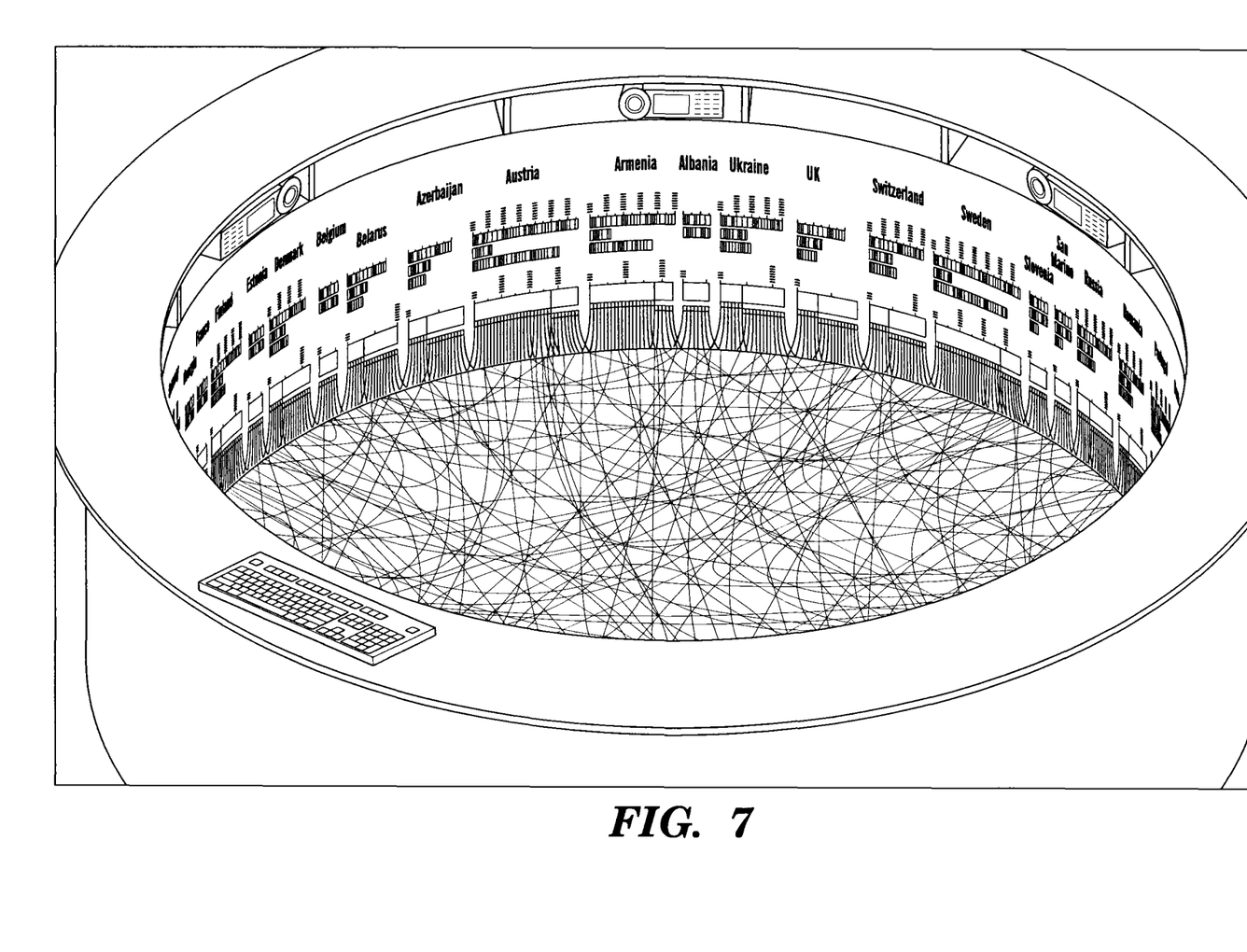

In other applications, as illustrated in FIGS. 6 and 7, the shared angular dimension, the height dimension and the radial dimension may comprise orthogonal display dimensions for contextualizing data, and the method may further comprise employing the pseudo-volumetric display apparatus to visualize and interactively explore multi-dimensional data. Examples of such applications include, bio-informatic visualization systems including gene sequencing, brain connectomes and connectograms, and any other form of circular connected graphs including multiple quantifiable dimensions of the connected data.

The independent scaling and translation of the non-shared dimensions (i.e., the height dimension on the first image display surface and the radial dimension on the second image display surface) allow for vast flexibility in the exploration and representation of data. The first or second image display surfaces can also be used to represent a relationship between data entities distributed along the angular dimension.

Figure 8:
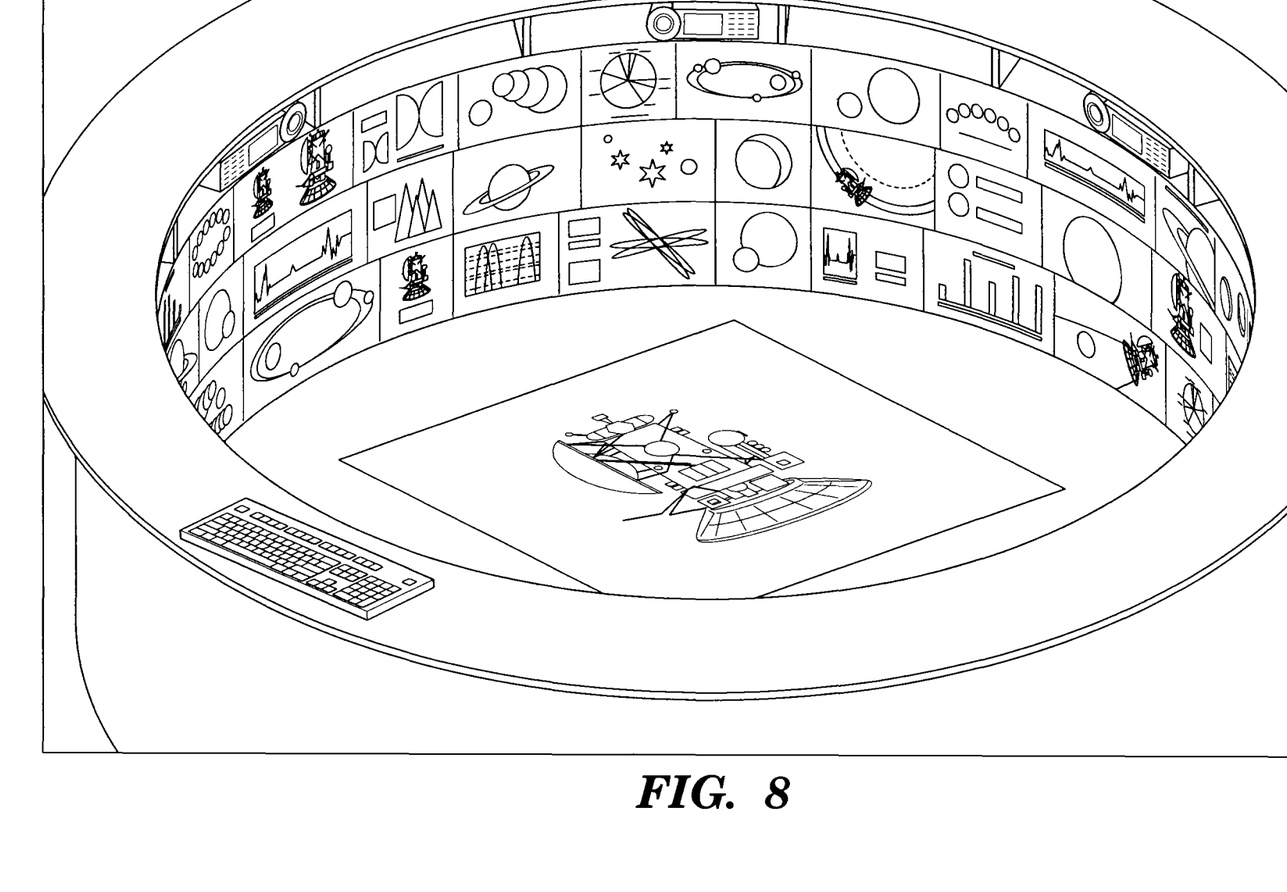
FIG. 8 illustrates the display of loosely coupled data with the pseudo-volumetric display apparatus.

Alternatively, loosely coupled information may be displayed on the two display surfaces, as depicted in the example of FIG. 8. The content may be contextually and/or semantically correlated rather than geometrically connected. The "dimension" they share is the content/context. In the example of FIG. 8, an interactive model of a Satellite is presented on the second image display surface and the first image display surface displays related images, web pages, and other information related to the image on the second image display surface.

The pseudo-volumetric display apparatus and method of the present invention may advantageously be employed for shared visualization and to facilitate interaction and collaboration among multiple simultaneous viewers. Further, the pseudo-volumetric display apparatus and method of the present invention provide a unique, shared, interactive visualization platform, scaled, configured and positioned to be gathered around as a focal point for and a common interface among multiple simultaneous viewers, thereby facilitating direct interaction and collaboration.

Although particular embodiments have been described herein for illustrative purposes, it will be apparent to those skilled in this art that various alterations, substitutions, combinations and the like will fall within the purview of the present invention.

What is claimed is:

1. A method for interactively displaying information employing a pseudo-volumetric display apparatus, comprising:
- arranging a first image display surface that is inwardly facing and having a continuous geometry with an open upper end for presenting an interior panoramic image, the first inwardly facing image display surface being continuous about its periphery in one dimension;
- arranging a second image display surface that is upwardly facing and located at a lower end of the first image display surface;
- connecting a first image generator for generating the interior panoramic image on the first image display surface;
- connecting a second image generator for generating the second image on the second image display surface, the second image being correlated and synchronized to the first image;
- wherein the first and second image display surfaces are adapted to enable viewing of the panoramic image and the second image from outside of the first image display surface via the open upper end by multiple simultaneous viewers seated and/or standing on a floor about the display apparatus;
- simultaneously presenting the same information or coupled information as a continuous Cartesian representation on the first image display surface and as a polar representation on the second image display surface; and
- synchronizing content of one of the polar representation and the continuous Cartesian representation in accordance with a selected position in the other of the polar representation and the continuous Cartesian representation.

2. The method of claim 1, wherein the first inwardly facing image display surface comprises at least one of a cylindrical, conical, slanted, or faceted surface; and
- the second image display surface comprises at least one of a planar, curved, slanted or faceted surface.

3. The method of claim 1, further comprising:
- connecting a first source of content for the interior panoramic image;
- connecting a second source of content for the second image; and
- wherein the content comprises at least one of the stored images, graphics, data or information, or a live feed of images, graphics, data or information.

4. The method of claim 1, wherein the information comprises visual images or data to be visualized.

5. The method of claim 4, wherein a position in the continuous Cartesian representation is identified by an angular dimension and a height dimension, a position in the polar representation is identified by an angular dimension and a radial dimension, and the first image display surface and the second image display surface share an angular dimension providing a consistent geometric connection between the continuous Cartesian representation on the first image display surface and the polar representation on the second image display surface.

6. The method of claim 5, further comprising user selection of the selected position.

7. The method of claim 5, wherein the selected position tracks motion of a moving object.

8. The method of claim 5, wherein the polar representation comprises a map or satellite imagery, the selected position comprises a location on the map or satellite imagery, and the continuous Cartesian representation comprises a panoramic view from said location.

9. The method of claim 5, wherein the polar representation and the continuous panoramic representation are independently scalable in the radial dimension and the height dimension, respectively.

10. The method of claim 4, wherein the information comprises radar or Lidar data, with latitude and longitude presented on the second image display surface, and altitude presented on the first image display surface.

11. The method of claim 5, wherein the shared angular dimension, the height dimension and the radial dimension comprise orthogonal display dimensions for contextualizing data, and further comprising: employing the pseudo-volumetric display apparatus to visualize and interactively explore multi-dimensional data.

12. The method of claim 1, further comprising: employing the pseudo-volumetric display apparatus for shared visualization, and to facilitate interaction and collaboration among multiple simultaneous viewers.

13. A pseudo-volumetric display apparatus, comprising:
- a first image display surface that is inwardly facing and having a continuous geometry with an open upper end for presenting an interior panoramic image, the first inwardly facing image display surface being continuous about its periphery in one dimension;
- a second image display surface that is upwardly facing and located at a lower end of the first image display surface;
- a first image generator for generating the interior panoramic image on the first image display surface;
- a second image generator for generating the second image on the second image display surface, the second image being correlated and synchronized to the first image;
- wherein the first and second image display surfaces are adapted to enable viewing of the panoramic image and the second image from outside of the first image display surface via the open upper end by multiple simultaneous viewers seated and/or standing on a floor about the display apparatus;
- wherein the first image generator and the second image generator are adapted to simultaneously present the same information or coupled information as a continuous Cartesian representation on the first image display surface and as a polar representation on the second image display surface, respectively; and
- a controller adapted to synchronize content of one of the polar representation and the continuous Cartesian representation in accordance with a selected position in the other of the polar representation and the continuous Cartesian representation.

14. The apparatus of claim 13, wherein the first inwardly facing image display surface comprises at least one of a cylindrical, conical, slanted, or faceted surface; and
- the second image display surface comprises at least one of a planar, curved, slanted or faceted surface.

15. The apparatus of claim 14, wherein the first inwardly facing image display surface comprises an interior cylindrical surface; and
- the second image display surface comprises a planar base surface adjoining a lower edge of the interior cylindrical surface.

16. The apparatus of claim 15, wherein the first image generator and the second image generator comprise at least one of an optical projector and an electronic display.

17. The apparatus of claim 16, wherein the first image generator comprises a plurality of optical projectors spaced about a periphery of the first image display surface; and the second image generator comprises at least one of an overhead optical projector, a rear optical projector, or an electronic display.

18. The apparatus of claim 16, further comprising a controller for continuously synchronizing the second image with the interior panoramic image; and a user interface connected to the controller for user interaction with the synchronized images.

19. The apparatus of claim 16, wherein the interior panoramic image and the second image comprise at least one of a static or a dynamic visual image or data representation.

20. The apparatus of claim 16, further comprising a support structure for supporting the interior cylindrical surface in an upright position and the planar base surface on a floor or a tabletop.

21. The apparatus of claim 16, further comprising:

a first source of content for the interior panoramic image;

a second source of content for the second image; and wherein the content comprises at least one of the stored images, graphics, data or information, or a live feed of images, graphics, data or information.

22. The apparatus of claim 21, wherein the first source and the second source comprise at least one of an image or set of images, a data set, a video game engine, a simulation, streaming information or a graphical user interface.

* * * * *